United States Patent
Michailiuk

[19]

[11] Patent Number: 5,996,280
[45] Date of Patent: Dec. 7, 1999

[54] MODULAR SOIL CONSERVING PLANTER

[76] Inventor: Rosa Michailiuk, 2110 NE. 54th St., Fort Lauderdale, Fla. 33308

[21] Appl. No.: 08/757,754

[22] Filed: Nov. 26, 1996

[51] Int. Cl.$^6$ ............................... A01G 9/02; C05G 3/00
[52] U.S. Cl. ........................................ 47/86; 47/84; 47/62
[58] Field of Search .................................. 47/86, 84, 62 C

[56] References Cited

U.S. PATENT DOCUMENTS

| | | | |
|---|---|---|---|
| 4,120,119 | 10/1978 | Engel | 47/66.1 |
| 4,291,499 | 9/1981 | Prewer | 47/86 |

FOREIGN PATENT DOCUMENTS

| | | | |
|---|---|---|---|
| 2659192 | 9/1991 | France | 47/62 C |
| 4025651 | 2/1992 | Germany | 47/86 |
| 988241 | 1/1983 | Russian Federation | 47/62 C |
| 1143350 | 3/1985 | Russian Federation | 47/62 C |
| 1558347 | 4/1990 | Russian Federation | 47/62 C |
| 2042491 | 9/1980 | United Kingdom | 47/62 C |

*Primary Examiner*—Henry E. Raduazo
*Attorney, Agent, or Firm*—M K. Silverman

[57] ABSTRACT

A modular soil conserving planter constitutes a longitudinal trough having open transverse end faces, the trough including a lower horizontal grate and an upper horizontal grate, each of such grates extending along substantially the longitudinal length of the trough, the lower grate defining a drainage grate and the upper grate defining a soil retention grate, a region of the trough beneath the drainage grate including apertures for control of drainage from the trough, in which longitudinal ends of the trough. Each longitudinal end of the trough further include means for selectable connections to open end faces of adjoining like planters.

7 Claims, 3 Drawing Sheets

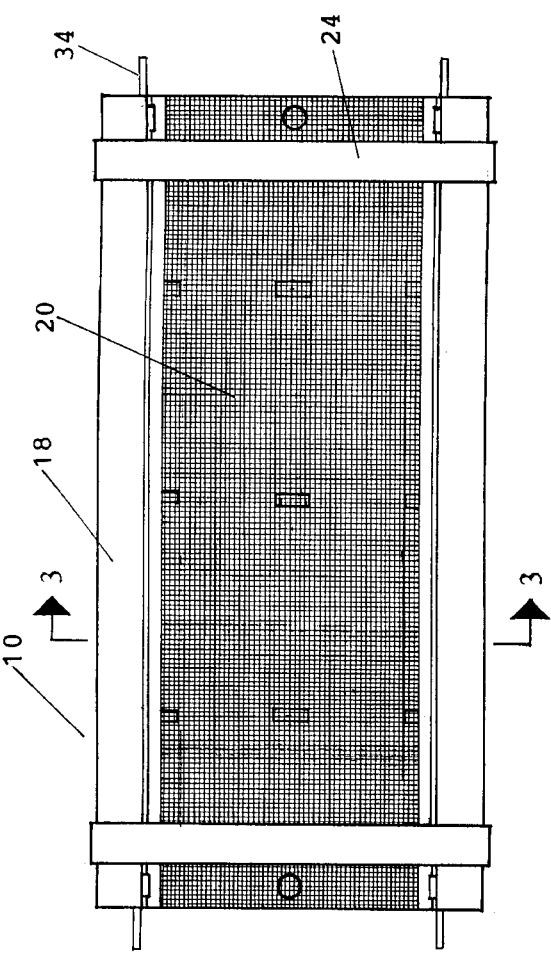
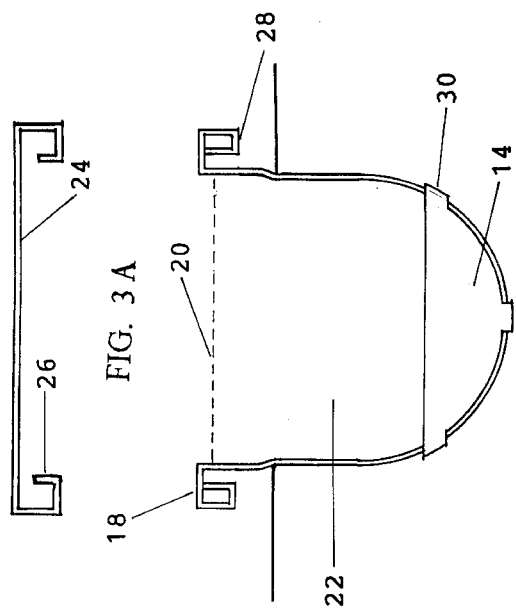
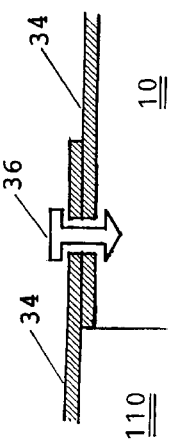

MODULAR SOIL CONSERVING PLANTER

BACKGROUND OF THE INVENTION

The present invention relates to a modular soil planter having as its purpose the conservation of soil, nutrients, and moisture within a defined growing region. The invention more particularly relates to a means for the retention of top soil and its related plant nutrients against the effects of rain, wind and absorption by the ambient earth which, in the absence of such a planter, would occur. The present invention also addresses the needs of outside plants having large root systems.

The prior art in the instant area, as best known to the within inventor, is characterized by the use of a sheet of plastic to define growing regions for a plant and its root structure and to cover the surface area of soil surrounding the plant to minimize the effect of wind and erosion upon the soil and nutrient base of the plant.

While above ground planters, typically used in association with household plants, are well known in the art, inground planters for use in a yard or in general nursery applications are less common. Further, to the extent that such inground planters have existed in the art, they have suffered from a number of limitations which include lack of provision of adequate space or volume for the growth of roots, adequate drainage means or control of moisture within the planter, insufficient protection of soil in the planter from the effects of wind, lack of means to prevent absorption of nutrients by surrounding soil, and inability to construct larger planting systems from individual components of prior art planters.

Also, prior art planters, whether above or inground, have not been designed or used with a contemplation of re-usage of the soil thereof for the next growing season.

The instant invention may, accordingly, be viewed as a response to the above set forth long felt needs in the art in those areas set forth above.

SUMMARY OF THE INVENTION

The instant modular soil conserving planter is definable in terms of a linear or curvilinear trough having open transverse end faces thereof. The width of the linear or curvilinear mouth of the trough is controlled through the use of a plurality of anti-spread brackets which are snap-fittably secured to rigid longitudinal lips of each side of each planter unit. Each planter further includes a lower drainage grate which is located at a horizontal level within the trough of the planter, and extending the longitudinal length thereof, which grate is located in the range of about twenty to about thirty-five percent of the greatest vertical height, that is, the top and the bottom dimension, of the planter. In the bottommost region of the planter, beneath the drainage gate, are provided drainage openings which comprise means for selectably controlling the rate at which water can escape from the planter through the effect of gravity and osmosis from surrounding soil. Situated above the drainage grate is the nutrient enriched growing soil which is provided with whatever degree of water or moisture is appropriate for the particular plant to be housed within the planter. Situated above the growing region (which extends to the entire longitudinal length of the planter) is a soil grate which is situated at a horizontal location which is just below the horizontal level of the mouth of the planter-defining linear or curvilinear trough. An upper side location of each side of each end, adjacent to said open transverse faces, of each planer unit is provided means for selectable securement, as by snap-clip or fit means, to a successive or abutting planter to thereby provide to an user of the instant system a means which are of value for landscaping and soil control purposes.

It is accordingly an object of the present invention to provide a modular soil conserving planter to protect nutrients and moisture-containing top soil from the effects of rain, wind and absorption by the surrounding unenriched soil and to facilitate botanical enrichment of the environment in nutrient-poor soil regions such as the desert.

It is another object to provide a planter which may be linked to a plurality of like or similar planters to form a planting system having any geometry, as may be desired for landscaping, soil control, or other purposes.

It is a further object of the invention to provide a soil conserving planter particularly adapted for external inground usage with plants having large root systems.

It is a yet further object to provide a planter of the above type which include means for control of the rate of drainage of water and moisture therefrom.

It is a still further object to provide a modular soil conserving planter of the above type which will permit the re-usage of nutrient enriched soil for successive growing seasons.

It is a still further object to provide a soil conserving planter of the above type which is particularly useful with plants having large or expanding root systems.

The above and yet other objects and advantages of the present invention will become apparent from the hereinafter set forth Brief Description of the Drawings, Detailed Description of the Invention and claims appended herewith.

BRIEF DESCRIPTION OF THE DRAWINGS

FIG. 3 is a radial or vertical cross-sectional view taken along Line 3—3 of FIG. 1.

FIG. 3A is a plan view of an anti-spread member used with the instant invention.

FIG. 4 is a top plan view of the linear embodiment of the invention shown in FIG. 1.

FIG. 5 is an enlarged schematic view of a snap-clip unit-to-unit connecting means shown in FIG. 4.

DETAILED DESCRIPTION OF THE INVENTION

Figure 1:
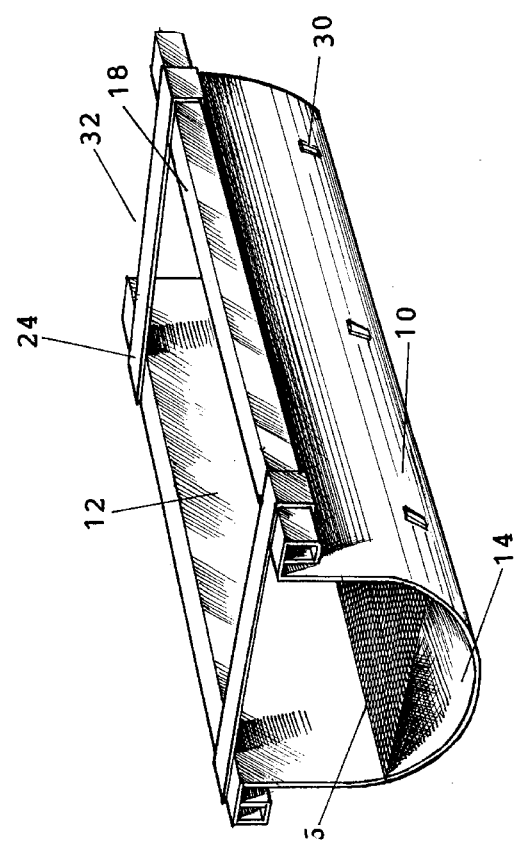
FIG. 1 is a perspective view of a linear embodiment of the present modular soil conserving planter.

FIG. 1 is a perspective view of a single unit 10 of a linear embodiment of the present modular soil conserving planter. As may be noted therefrom and, as well, the cross-sectional view of FIG. 3, the planter is defined by an elongated longitudinal trough 12 having a lower region 14 which is preferably arcuate of curved but need not necessarily have such a geometry. The trough 12 further includes a drainage grate 16 which is horizontally positioned along the entire longitudinal length of the unit 10 and is located in a range of about twenty to about thirty-five percent of the vertical height of the trough, with about thirty percent being optimal.

Below the mouth or rigid lips 18 of the trough and, more particularly, at about five percent below the mouth of the trough is positioned a soil grate 20, the function of which is to protect the nutrient enriched soil located within soil region 22 from the effects of wind and rain which, in the absence of such a soil grate, would permit the blowing or washing away of the nutrient enriched soil within the region 22.

As may be further noted in the view of FIGS. 1 and 3, the trough 12 is provided with a plurality of anti-spread members 24, the function of which is to preclude any change in width-wise dimension of the channel defined by the trough 12 of unit 10. The anti-spread member is shown in side plan view in FIG. 3A. Accordingly, as may be appreciated therefrom, the anti-spread member 24 is provided with L-shaped complemental engagement elements 26 which mate with complemental rectangular engagement means 28 (see FIG. 3) which depend downwardly from lips 18 of the trough 12. Accordingly, a plurality of the anti-spread members 24 may be affixed to the trough 12 through the snap-fit connection between L-shaped elements 26 of the members 24 and the rectangular engagement means 28 of lip 18 of the trough-like units 12.

Figure 2:
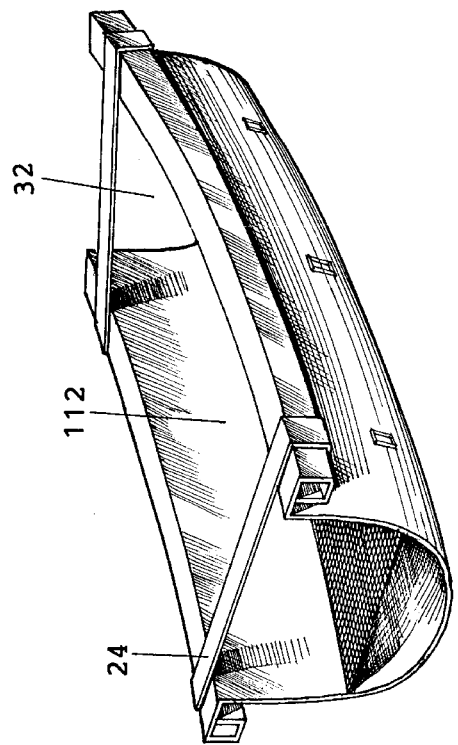
FIG. 2 is a perspective view of a curved embodiment thereof.

As may be noted in the view of FIG. 2 each of the trough-like units 12 may define a curved or curvilinear longitudinal geometry as may be seen by the trough 112 shown in FIG. 2. In all other respects the embodiment of FIG. 2 is identical to that of the embodiment of FIG. 1.

With further reference to the cross-sectional view of FIG. 3, the inventive modular soil conserving planter may be seen to further include a plurality of drainage openings 30, all of which (or none of which) may be used with a given type of plant. Accordingly, the plurality of such drainage openings 30 provide for the drainage or escape of moisture passing through drainage grate 16 in accordance with the particular drainage or moisture requirement of a given type of plant. That is, any one or more (or none) of the drainage openings 30 may be fully or partially blocked in accordance with that drainage characteristic which is most advantageous to the particular species of plant to be grown within the planter 10.

It is further noted, with reference to the view of FIGS. 1 and 2, that the trough 12 includes open end faces 32. That is, the ends of the trough 12 (in the linear embodiment) and 112 (in the curvilinear embodiment) are entirely open. The purpose of such open end faces 32 of the present planter is to permit plants having large root systems to grow longitudinally into the next adjoining planter of a planter system formed of units of the present invention.

Figure 6:
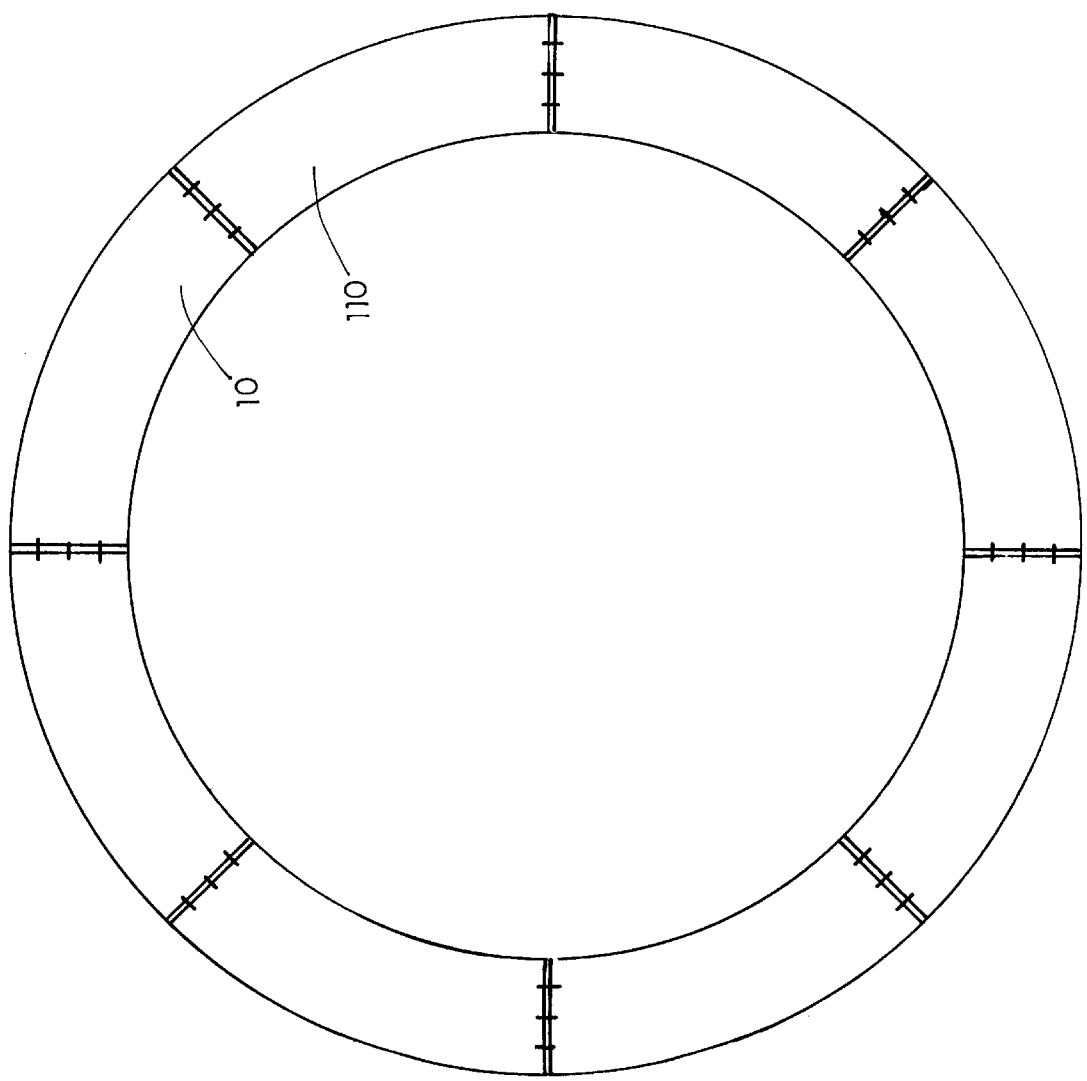
FIG. 6 is a top plan view showing the geometry of a system which may be formed through the connection of a plurality of the instant modular soil conserving planters, to each other.

The planter unit 10 may be further seen with reference to the top view of FIG. 4 in which may be seen said trough lips 18, said soil grate 20, said anti-spread members 24, said drainage openings 30, and longitudinal projections 34 which are integral with the left and right rigid lips 18. Such protrusions are substantially vertical and are characterized by snap-clip means 36 (see also FIG. 5) which facilitate the connection of said protrusions 34 to protrusions 34a of an adjoining or abutting planter 110 to be joined to planter 10. Accordingly, through the use of snap-clip means 36, or means equivalent thereto, a plurality of the linear of curvilinear planters may be connected to each other to form a system geometry which is compatible with any landscaping or land use objective. An example thereof is shown in the top schematic view of FIG. 6 in which there is shown a plurality of the units joined to each other through the use of snap-clip means 36.

It is noted that the open end faces 32 of adjoining planters may overlap before the above snap-clip is secured. Further, a third snap-clip may be provided at the bottom of the trough of each open end face.

It is further noted that a plurality of radial separators may be axially located, at distances of about 1.5 feet therebetween, within each trough 10, and at one of the open end faces 32. Such separators may be secured by radial ridges or channels within the troughs.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

Having thus described my invention what I claim as new, useful and non-obvious and, accordingly, secure by Letters Patent of the United States is:

1. A modular soil conserving planter, comprising:

a longitudinal trough having open transverse end faces, said trough including a lower horizontal grate and an upper horizontal grate, each of said grates extending along substantially the longitudinal length of said trough, said lower grate defining a drainage grate and said upper grate defining a soil retention grate, a region of said trough beneath said drainage grate including means for control of drainage from said trough, in which longitudinal ends of said trough, each longitudinal end of said trough further including means for selectable connections to open end faces of adjoining like planters.

2. The planter as recited in claim 1, in which a vertical location of said horizontal drainage grate is that of between twenty and thirty five percent of the vertical depth of said trough.

3. The planter as recited in claim 2, in which said trough includes longitudinal top edges comprising rigid lips including first complemental securement means formed integrally therewith.

4. The planter as recited in claim 3, further comprising a plurality of transverse anti-spread members having, at opposite ends thereof, second securement means complemental to said first complemental securement means of said rigid lips of said trough.

5. The planter as recited in claim 1 in which said means for connection of open end faces of adjoining planters each comprises snap-clip securement means oriented substantially horizontally and proximal to ends of top edges of said trough.

6. The planter as recited in claim 4, in which said longitudinal trough is linear.

7. The planter as recited in claim 4, in which said longitudinal trough is curvilinear.

\* \* \* \* \*